United States Patent
Ohira et al.

(10) Patent No.: US 9,573,634 B2
(45) Date of Patent: Feb. 21, 2017

(54) FRONT AIR-FLOW STREAMLINING STRUCTURE OF AUTOMOTIVE VEHICLE

(71) Applicant: MAZDA MOTOR CORPORATION, Hiroshima (JP)

(72) Inventors: Hiroki Ohira, Higashihiroshima (JP); Masanori Minamisawa, Hiroshima (JP); Eiji Yoshimura, Higashihiroshima (JP); Toshio Sakamoto, Hiroshima (JP); Takanori Tsubaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/598,523

(22) Filed: Jan. 16, 2015

(65) Prior Publication Data

US 2015/0225026 A1 Aug. 13, 2015

(30) Foreign Application Priority Data

Feb. 12, 2014 (JP) .................. 2014-024001

(51) Int. Cl.
*B62D 35/00* (2006.01)
*B62D 35/02* (2006.01)
*B62D 25/08* (2006.01)

(52) U.S. Cl.
CPC ............. *B62D 35/005* (2013.01); *B62D 25/08* (2013.01); *B62D 35/02* (2013.01)

(58) Field of Classification Search
CPC ........ B62D 35/005; B62D 35/02; B62D 25/08
USPC ............... 296/180.1, 180.5, 187.04; 180/903
See application file for complete search history.

(56) References Cited

U.S. PATENT DOCUMENTS

| | | | |
|---|---|---|---|
| 4,291,911 A | * | 9/1981 | Gallmeyer ........... B62D 35/005 280/770 |
| 2011/0181075 A1 | * | 7/2011 | Glickman ........... B62D 35/005 296/193.09 |

FOREIGN PATENT DOCUMENTS

| | | |
|---|---|---|
| JP | S63-139182 U | 9/1988 |
| JP | 2002-308154 A | 10/2002 |
| JP | 2006-219019 A | 8/2006 |

* cited by examiner

*Primary Examiner* — Joseph D Pape
*Assistant Examiner* — Dana Ivey
(74) *Attorney, Agent, or Firm* — Studebaker & Brackett PC

(57) ABSTRACT

In a front air-flow streamlining structure of an automotive vehicle comprising a cover front portion of an under cover of a vehicle front portion and an air dam provided at a front bumper, a deflector is provided between the air dam and a front wheel house to be spaced rearward apart from the air dam, to project downward, and to extend in a vehicle width direction, an outward end portion, in the vehicle width direction, of the air dam is provided substantially continuously to the deflector, a pocket portion enclosed by the cover front portion, the air dam, and the deflector is provided such that an inward side, in the vehicle width direction, thereof opens, and a traveling-air intake portion which opens so as to take in traveling air toward the pocket portion is provided at the air dam.

14 Claims, 12 Drawing Sheets

FRONT AIR-FLOW STREAMLINING STRUCTURE OF AUTOMOTIVE VEHICLE

BACKGROUND OF THE INVENTION

The present invention relates to a front air-flow streamlining structure of an automotive vehicle, which is configured to streamline traveling air which flows (comes) in below a vehicle floor from a vehicle front side of the automotive vehicle, for example.

An automotive vehicle receives air resistance which is caused by air's (traveling air's) collision, friction or the like during vehicle traveling. Since this air resistance greatly influences the power performance and the fuel-economy performance of the automotive vehicle, it has been desired to reduce the air resistance by means of a vehicle-body shape, an air-flow streamlining plate or the like.

The air resistance during the vehicle traveling which influences the performances of the automotive vehicle includes one which is caused by turbulence of the side-face air flowing down along a vehicle's side face. This air resistance is generated when the traveling air flows in below a floor of the automotive vehicle and this below-floor traveling air which flows into a front wheel house is disturbed by the rotation of a front wheel and then exhausted toward a vehicle side.

Herein, an example of technologies of restraining the below-floor traveling air from flowing into the front wheel house is disclosed in Japanese Utility-Model Laid-Open Publication No. S63-139182, for example. In a lower structure of an automotive vehicle of this publication document, the flowing direction of the below-floor traveling air is changed downward by a shut-off plate which is provided near a front end of the front wheel house to extend downward, thereby restraining the below-floor traveling air from flowing into the front wheel house.

Further, in a front lower structure of a vehicle disclosed in Japanese Patent Laid-Open Publication No. 2002-308154, the flowing direction of the below-floor traveling air is changed downward by exhausting the traveling air downward from an ejection port through a nozzle from an air introduction port provided at a front bumper, thereby restraining the below-floor traveling air from flowing into the front wheel house.

Meanwhile, a technology of obtaining a down force of vehicle front portion by streamlining the below-floor traveling air, in addition to reducing the air resistance during the vehicle traveling by restraining the below-floor traveling air from flowing into the front wheel house, has been also proposed.

A front air-flow streamlining structure of a vehicle disclosed in Japanese Patent Laid-Open Publication No. 2006-219019, for example, comprises a pocket portion which is enclosed by an air dam extending along a lower edge of a front bumper provided forward of the front wheel house and a deflector extending in a vehicle width direction at a front end of the front wheel house. This pocket portion is configured such that an inward side, in the vehicle width direction, thereof opens, and formed substantially in a fan shape in the bottom view.

Since the traveling air may not easily flow into the pocket portion, the pressure of the inside of the pocket portion becomes smaller than that of the circumference. Accordingly, in the structure of the above-described patent publication, the area having a relatively negative pressure is generated in the pocket portion, so that a strong downward-pressing force, i.e., a strong down force, can be generated at the vehicle front portion.

However, while the front air-flow streamlining structure of the vehicle disclosed in the above-described patent publication is useful to the automotive vehicle having high sporty performances including a vehicle's design, it has a problem in that a wagon type of vehicle having a box-shaped or curve-shaped vehicle's rear portion may not easily balance a (dynamic) lift generated at the vehicle front portion with another (dynamic) lift generated at the vehicle's rear portion. Therefore, there is a concern for this front air-flow streamlining structure that the position of such a wagon type of vehicle may change such that its front goes down, so that the maneuverability and stability may deteriorate, or that the air resistance may increase improperly due to an excessive down force.

SUMMARY OF THE INVENTION

The present invention has been devised in view of the above-described matters, and its object is to provide a front air-flow streamlining structure of an automotive vehicle which can reduce the air resistance during vehicle traveling and also easily adjust the lift generated at the vehicle front portion.

According to the present invention, there is provided a front air-flow streamlining structure of an automotive vehicle, comprising an under cover covering a lower-face opening of a vehicle front portion of the automotive vehicle which is positioned forward of a front wheel house, a downward-extension portion projecting downward and extending along a lower edge of a front bumper, and a partition wall portion provided between the downward-extension portion and the front wheel house to be spaced rearward apart from the downward-extension portion, wherein the partition wall portion is configured to project downward and extend in a vehicle width direction, a pocket portion enclosed by the under cover, the downward-extension portion, and the partition wall portion is provided such that a vehicle-downward side thereof opens, and a traveling-air intake portion which opens so as to take in traveling air toward an inside of the pocket portion is provided at the downward-extension portion or at a position located above the downward-extension portion.

Herein, the above-described partition wall portion can be formed integrally with the under cover or formed separately from the under cover. Further, the partition wall portion may be comprised of a deflector to restrain the traveling air from flowing into the front wheel house.

The above-described downward-extension portion can be formed separately from or integrally with the front bumper or the under cover, and can be comprised of an air dam which is formed separately from the front bumper, for example. Further, the downward-extension portion can be formed in a range, in a vehicle width direction, of the front bumper which substantially faces the front wheel house in a longitudinal direction or formed along an entire area, in the vehicle width direction, of the front bumper.

The above-described traveling-air intake portion can be comprised of an opening having a specified size, an end-portion opening hole which opens upward and an upward opening of which is covered with the under cover, an opening having a specified size which is equipped with a side wall provided along an opening edge thereof, or the like.

According to the present invention, the air resistance during vehicle traveling can be reduced and the lift generated at the vehicle front portion can be adjusted easily. Specifically, since the direction of the traveling air can be changed downward by the downward-extension portion, the front air-flow streamlining structure of the automotive vehicle can restrain the traveling air from flowing into the front wheel house. Thereby, the front air-flow streamlining structure of the automotive vehicle can restrain the air resistance caused by the turbulence of the side-face air flowing down along the vehicle's side face.

Further, in a case in which the vehicle is configured such that a front end of the vehicle front portion is formed in a curve shape in the bottom view, the downward-extension portion can guide the traveling air flowing from the vehicle front side toward the vehicle's side face. Thereby, the front air-flow streamlining structure of the automotive vehicle can reduce the air resistance more.

And, since the traveling-air intake portion introduces the traveling air into the pocket portion, the front air-flow streamlining structure of the automotive vehicle can adjust the lift generated at the vehicle front portion easily. More specifically, the traveling-air intake portion introduces the traveling air into the pocket portion, so that the front air-flow streamlining structure of the automotive vehicle can decrease the difference in speed between the traveling air flowing outside the pocket portion and the traveling air flowing inside the pocket portion.

Accordingly, the front air-flow streamlining structure of the automotive vehicle can decrease the pressure inside the pocket portion, or substantially eliminate the deference in pressure between the outside of the pocket portion and the inside of the pocket portion. In this case, the front air-flow streamlining structure of the automotive vehicle can restrict the flow amount of the traveling air taken in by the traveling-air intake portion by properly setting the size of the opening of the traveling-air intake portion.

For example, by setting the opening of the traveling-air intake portion to be properly small, the front air-flow streamlining structure of the automotive vehicle can decrease the flow amount of the traveling air taken in by the traveling-air intake portion, thereby generating the negative pressure inside the pocket portion. Meanwhile, by setting the opening of the traveling-air intake portion to be properly large, the front air-flow streamlining structure of the automotive vehicle can increase the flow amount of the traveling air taken in by the traveling-air intake portion, thereby restraining the negative pressure from being generated inside the pocket portion.

Thereby, the front air-flow streamlining structure of the automotive vehicle can easily adjust the lift generated at the vehicle front portion. Accordingly, the front air-flow streamlining structure of the automotive vehicle can easily adjust the balance of the lift generated at the vehicle front portion with the lift generated at the vehicle rear portion according to the kind of the vehicle, without providing any wing or something to generate the down force at the vehicle's rear portion, for example. Thus, the front air-flow streamlining structure of the automotive vehicle can reduce the air resistance during vehicle traveling and also easily adjust the lift generated at the vehicle front portion.

According to an embodiment of the present invention, the downward-extension portion extending along the lower edge of the front bumper is configured such that an outward end portion, in the vehicle width direction, thereof is provided substantially continuously to the partition wall portion, whereby the pocket portion is configured such that an inward side, in the vehicle width direction, thereof opens.

In this case, by combining the above-described continuous structure of the outward end portion of the downward-extension portion to the partition wall portion (which performs the function of increasing the magnitude of the negative pressure generated in the pocket portion) and the above-described traveling-air intake structure of taking into the pocket portion through the traveling-air intake portion (which performs the function of decreasing the magnitude of the negative pressure generated in the pocket portion), the negative pressure which is finally generated inside the pocket portion can be adjusted properly and suitably for the vehicle.

According to another embodiment of the present invention, the traveling-air intake portion is configured to open at an inward portion, in the vehicle width direction, of the downward-extension portion. Thereby, the front air-flow streamlining structure of the automotive vehicle can supply the traveling air into the pocket portion efficiently.

Specifically, in the case in which the vehicle is configured such that the front end of the vehicle front portion is formed in the curve shape in the bottom view, for example, the flow of the traveling air at the vehicle front portion is configured such that an inward-side flow is rather straight and an outward-side flow curves toward the vehicle side. This is because the traveling air received at a curve portion of the vehicle front portion flows toward the vehicle's side face along the curve portion of the vehicle front portion.

Therefore, in a case in which the traveling-air intake portion is formed at the curve portion of the vehicle front portion, the traveling-air intake portion cannot take in the traveling air flowing toward the vehicle side stably, so that there is a concern that the traveling air having a large flow amount enough to adjust the lift at the vehicle front portion may not be introduced or the turbulence of the traveling air flowing toward the vehicle side may become improperly large.

Then, by forming the traveling-air intake portion at the inward portion, in the vehicle width direction, of the downward-extension portion, the traveling-air intake portion can surely take in the traveling air flowing from the vehicle front side. Thereby, even if the opening of the traveling-air intake portion is small, for example, the front air-flow streamlining structure of the automotive vehicle can efficiently guide the traveling air having the large flow amount enough to adjust the lift at the vehicle front portion into the pocket portion.

Accordingly, the front air-flow streamlining structure of the automotive vehicle can surely guide the traveling air to the inside of the pocket portion by forming the traveling-air intake portion at the inward portion, in the vehicle width direction, of the downward-extension portion, so that the lift generated at the vehicle front portion can be stabilized.

According to another embodiment of the present invention, the traveling-air intake portion is configured to slant from a vehicle inward side toward a vehicle outward side. Thereby, the front air-flow streamlining structure of the automotive vehicle can guide the traveling air to the inside of the pocket portion more surely.

Specifically, in a case in which the position of the traveling-air intake portion is close to the opening of the pocket portion in the vehicle width direction, there is a concern that the traveling air taken in by the traveling-air intake portion may flow out of the opening of the pocket portion.

Herein, by configuring such that the traveling-air intake portion slants from the vehicle inward side toward the vehicle outward side, the traveling-air intake portion can take in the traveling air such that the traveling air taken in flows from the vehicle inward side toward the vehicle outward side in the pocket portion.

Thereby, the front air-flow streamlining structure of the automotive vehicle can restrain the traveling air taken in by the traveling-air intake portion from flowing out of the opening of the pocket portion. Accordingly, the front air-flow streamlining structure of the automotive vehicle can surely guide the traveling air into the pocket portion through the traveling-air intake portion, thereby stabilizing the lift generated at the vehicle front portion more.

Further, in a case in which the front end of the vehicle front portion is formed in the curve shape in the bottom view and the traveling-air intake portion is formed near the border of the inward portion and the curve portion of the vehicle front portion, for example, the traveling-air intake portion can take in the traveling air flowing rearward from the vehicle front side and the traveling air flowing toward the vehicle's side face.

Thereby, the front air-flow streamlining structure of the automotive vehicle can introduce the traveling air into the pocket portion more efficiently through the traveling-air intake portion even in a case in which the size of the opening of the traveling-air intake portion is not set to be sufficiently large. Thus, by configuring such that the traveling-air intake portion slants from the vehicle inward side toward the vehicle outward side, the front air-flow streamlining structure of the automotive vehicle can efficiently introduce the traveling air into the pocket portion, thereby stabilizing the lift generated at the vehicle front portion.

According to another embodiment of the present invention, the partition wall portion is comprised of a deflector which is fixedly attached to a rear end of the under cover. Thereby, the front air-flow streamlining structure of the automotive vehicle can easily adjust the lift generated at the vehicle front portion, without increasing the number of parts/components.

Specifically, the partition wall portion constituting the pocket portion also functions as the deflector to restrain the traveling air from flowing into the front wheel house, so that the front air-flow streamlining structure of the automotive vehicle does not require that the partition wall portion and the deflector are formed separately from each other.

Thereby, the front air-flow streamlining structure of the automotive vehicle can properly restrain the vehicle weight or the costs from increasing. Thus, by configuring such that the partition wall portion is comprised of the deflector, the front air-flow streamlining structure of the automotive vehicle can achieve both reduction of the air resistance during vehicle traveling and adjustment of the lift generated at the vehicle front portion, without increasing the number of parts/components.

Additionally, an air-guide portion to guide the traveling air taken in by the traveling-air intake portion may be provided at the under cover of the pocket portion. This air-guide portion can be comprised of a groove-shaped recess portion which is provided at a vehicle's upper portion to open upward, a groove-shaped side wall which is provided to project downward, or a fin-shaped air-flow streamlining plate which is provided to project downward. Further, the air-guide portion can be formed integrally with or separately from the under cover.

Thus, the front air-flow streamlining structure of the automotive vehicle can stabilize the pressure in the pocket portion.

Specifically, in a case in which the traveling-air intake portion is configured to slant from the inward side toward the outward side, for example, the traveling air taken in by the traveling-air intake portion flows, spreading in the pocket portion, and then flows out of the opening of the pocket portion, or flows out from a rear end of the downward-extension portion toward the vehicle side, so that there is a concern that the lift generated at the vehicle front portion may become unstable.

Then, by providing the air-guide portion, the front air-flow streamlining structure of the automotive vehicle can guide the traveling air taken in by the traveling-air intake portion with the air-guide portion properly inside the pocket portion. Thereby, the front air-flow streamlining structure of the automotive vehicle can restrain the traveling air taken in from spreading.

In this case, since a larger amount of traveling air can spread in the pocket portion, the front air-flow streamlining structure of the automotive vehicle can stabilize the pressure in the pocket portion. Thus, the front air-flow streamlining structure of the automotive vehicle can stabilize the lift generated at the vehicle front portion more by means of the air-guide portion.

According to another embodiment of the present invention, the under cover is attached to a lower end of the front bumper, a deflector, of which the above-described partition wall portion is comprised, is provided at a rear end portion of the under cover, and the traveling-air intake portion is configured to take in the traveling air toward the deflector.

Thereby, the traveling-air streamlining effect by the deflector can be improved. That is, the traveling air taken in by the traveling-air intake portion flows down toward the deflector keeping its flowing speed, and then the traveling air which has reached the deflector flows downward, changing its flow direction. And, when this flowing air joins to the traveling air which flows near a lower end of the deflector, this flowing air with the direction changed by the deflector operates so as to change the flowing direction of the above-described traveling air flowing near the lower end of the deflector downward. Accordingly, it can be properly prevented that the traveling air flowing below the floor of the front portion of the vehicle flows into the front wheel house. Thus, the present embodiment can improve the streamlining effect of the traveling air by the deflector with the traveling-air intake portion.

According to another embodiment of the present invention, the traveling-air intake portion is configured to slant from a vehicle inward side toward a vehicle outward side or slant from the vehicle outward side toward the vehicle inward side. Thereby, the above-described improvement of the streamlining effect of the traveling air by the deflector can be surely attained.

According to another embodiment of the present invention, the downward-extension portion is formed separately from the front bumper and has an opening portion at least at an upper portion thereof which opens toward the partition wall portion, and the traveling-air intake portion is comprised of the opening portion of the downward-extension portion and the front bumper.

Thereby, replacement of the downward-extension portion can be easy and the traveling-air intake portion can be formed at a loser position to the under cover. Specifically, since the downward-extension portion is located at the level lower than the under cover, there is a concern that the downward-extension portion may get broken when interfering with the road surface. Herein, if the traveling-air intake portion deforms or gets broken, the streamlining effect by the partition wall portion may not be attained sufficiently. Thus, the present embodiment in which the downward-extension portion is formed separately from the front bumper is superior in easier replacing to a case in which the downward-extension portion is formed integrally with the front bumper. Accordingly, even if the downward-extension portion gets broken, a situation in which the streamlining effect is not obtained properly because of the traveling-air intake portion's deforming or getting broken can be prevented. Further, since the traveling-air intake portion is comprised of the opening portion of the downward-extension portion and the front bumper, the traveling-air intake portion can be formed at the loser position to the under cover. Thereby, the traveling air can be made to flow toward the partition wall portion along the under cover more surely. Accordingly, the maintenance of the vehicle front portion can be improved, improving the streamlining effect of the traveling air, by forming the downward-extension portion separately from the front bumper.

Other features, aspects, and advantages of the present invention will become apparent from the following description which refers to the accompanying drawings.

DETAILED DESCRIPTION OF THE INVENTION

Hereinafter, an embodiment of the present invention will be described referring to the accompanying drawings. A front air-flow streamlining structure of an automotive vehicle 1 according to the present embodiment will be described specifically referring to FIGS. 1-8, first.

Figure 1:
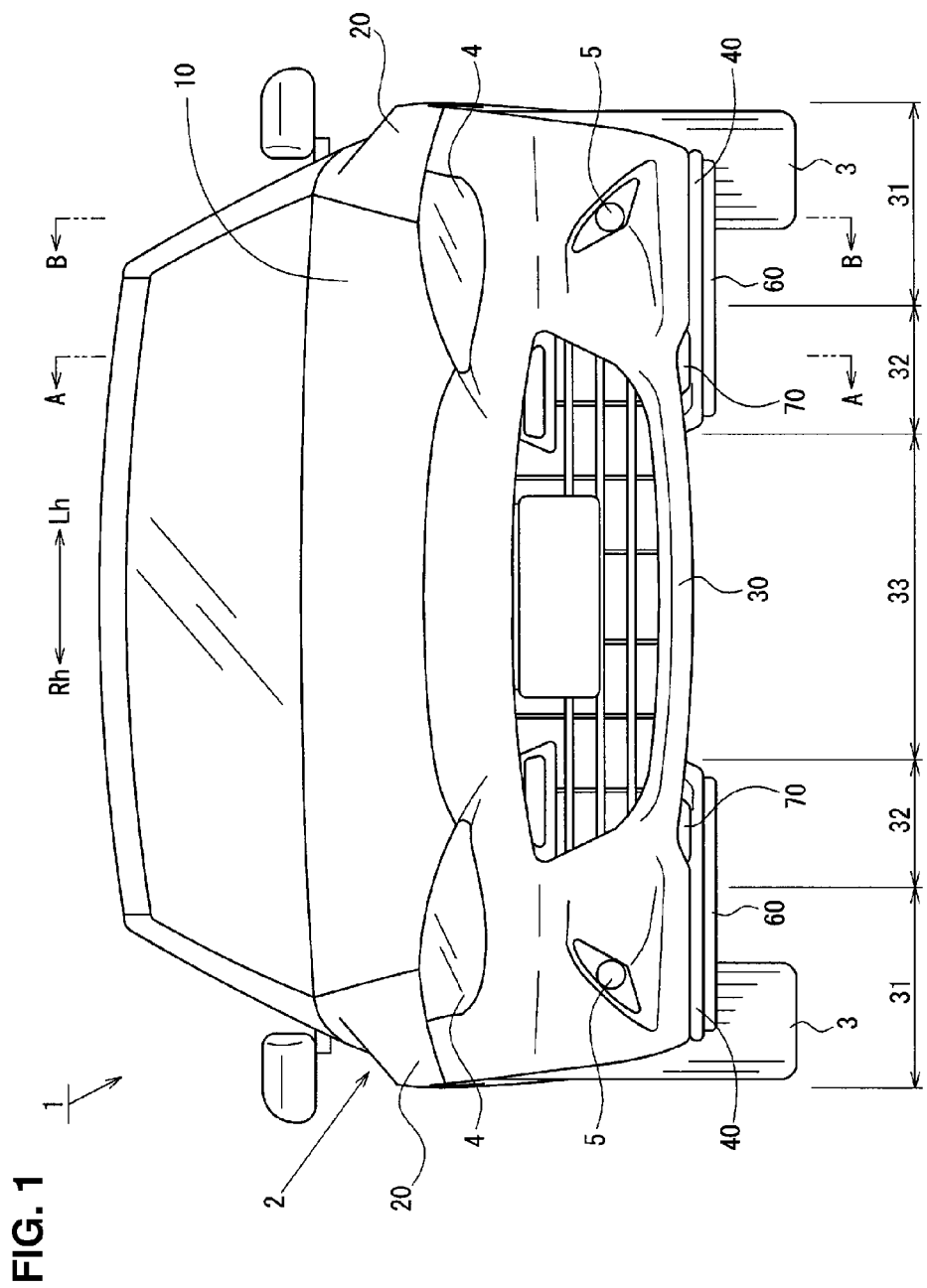
FIG. 1 is a front view showing external appearances of a vehicle front portion.
Figure 2:
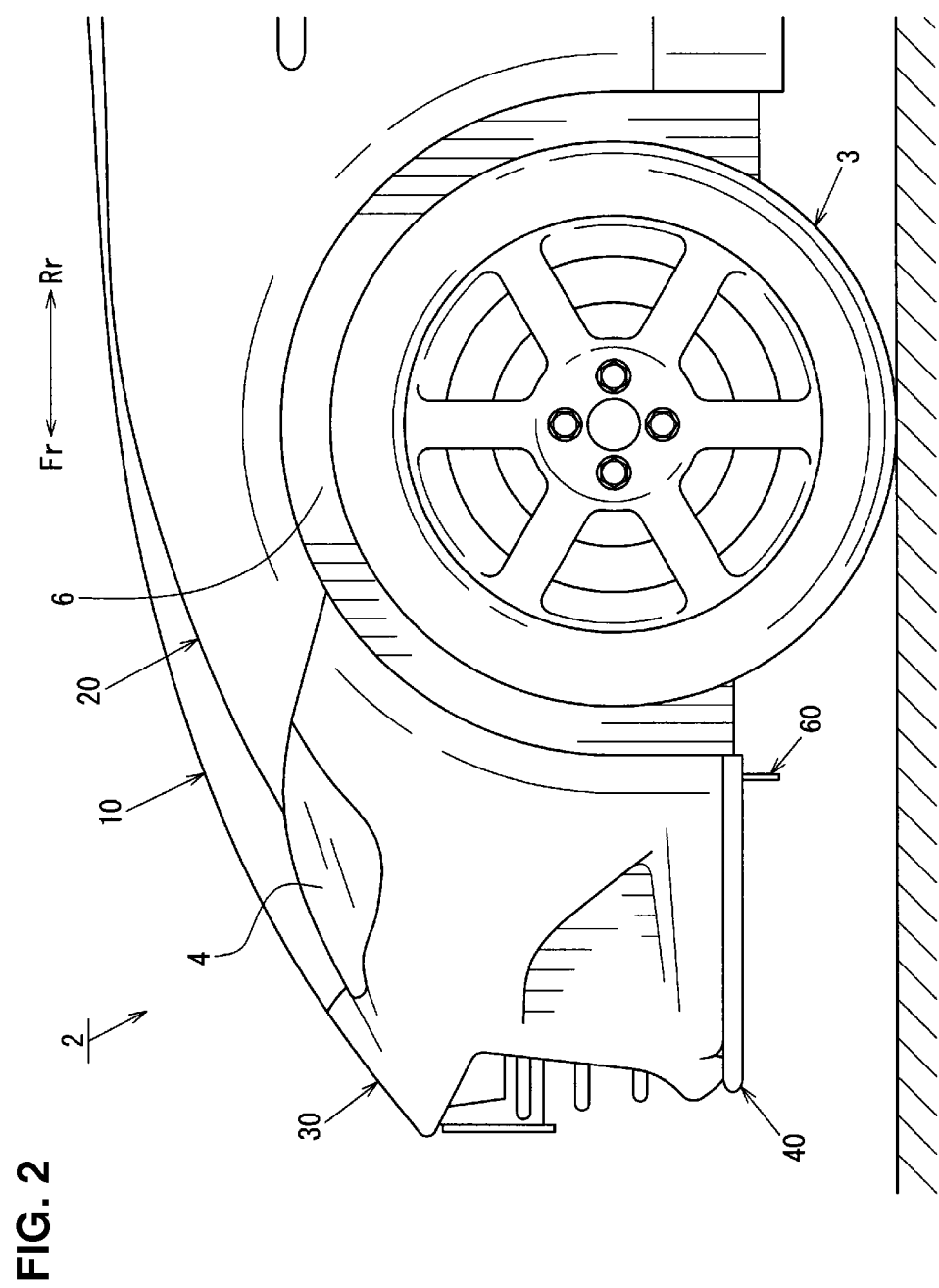
FIG. 2 is a left side view showing the external appearances of the vehicle front portion.
Figure 3:
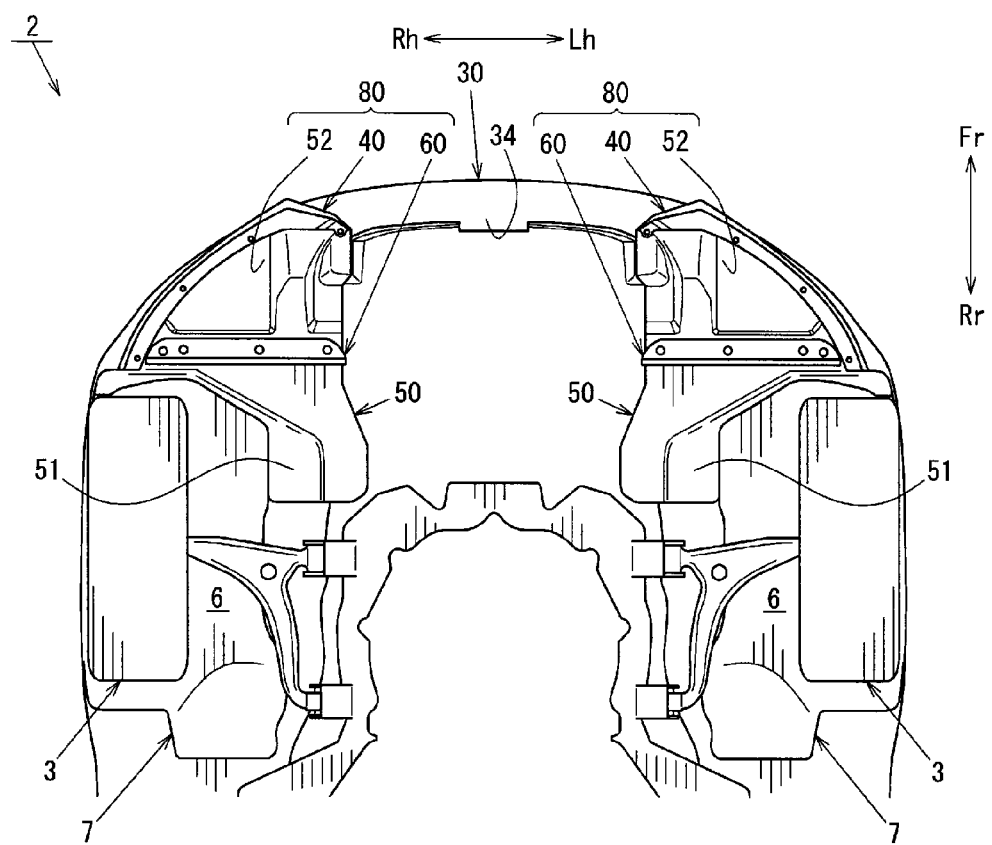
FIG. 3 is a bottom view showing the external appearances of the vehicle front portion.
Figure 4:
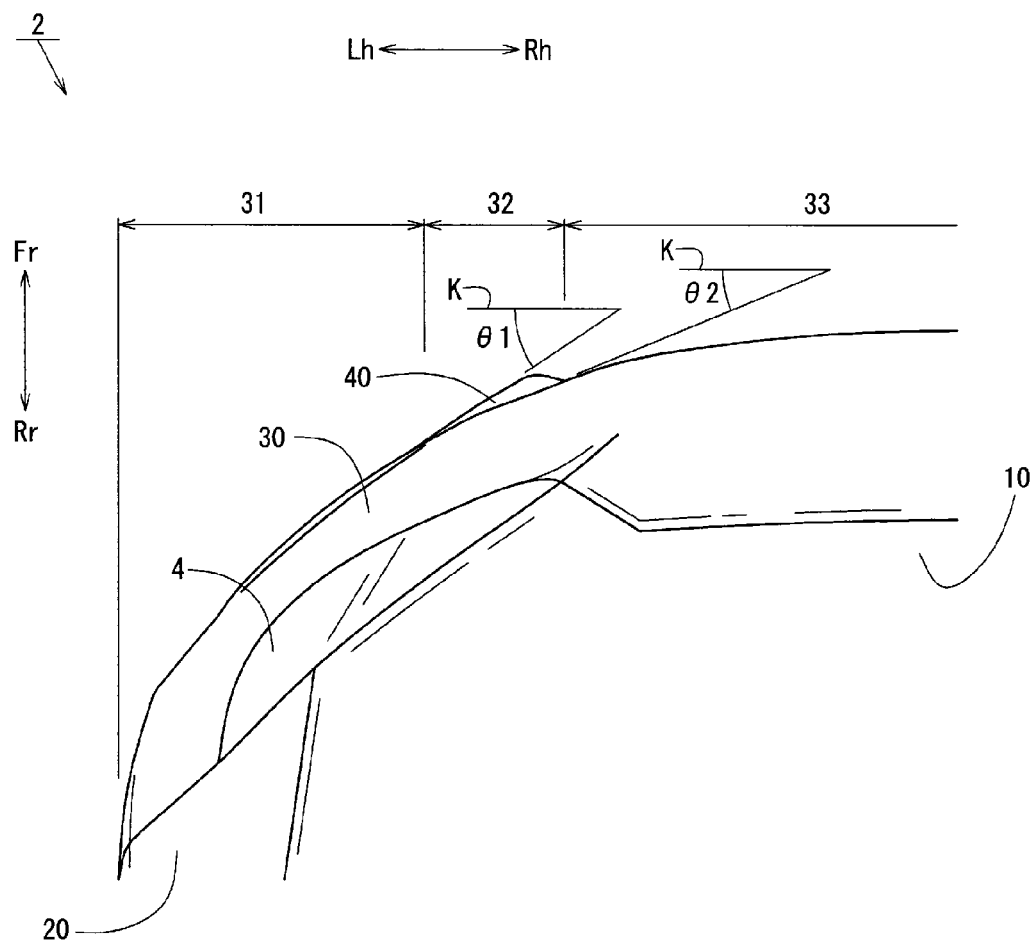
FIG. 4 is a plan view showing the external appearances of the vehicle front portion.
Figure 5:
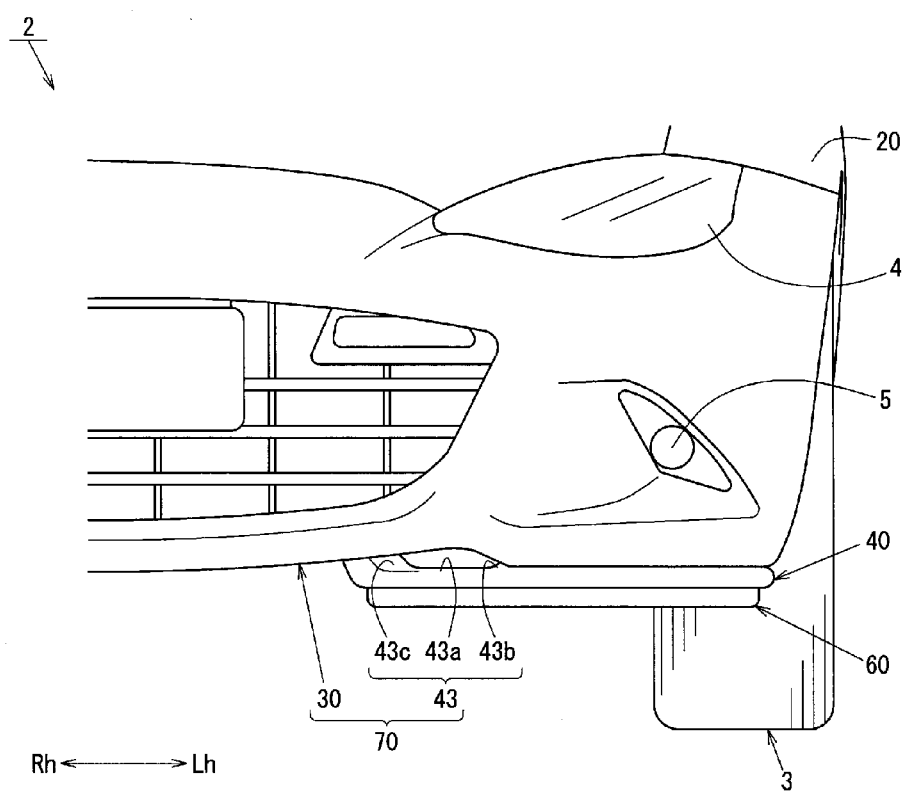
FIG. 5 is an enlarged front view showing a major part of the vehicle front portion.

Herein, FIG. 1 is a front view showing external appearances of a vehicle front portion 2, FIG. 2 is a left side view showing the external appearances of the vehicle front portion 2, FIG. 3 is a bottom view showing the external appearances of the vehicle front portion 2, FIG. 4 is a plan view showing the external appearances of the vehicle front portion 2, and FIG. 5 is an enlarged front view showing a major part of the vehicle front portion 2.

Figure 6:
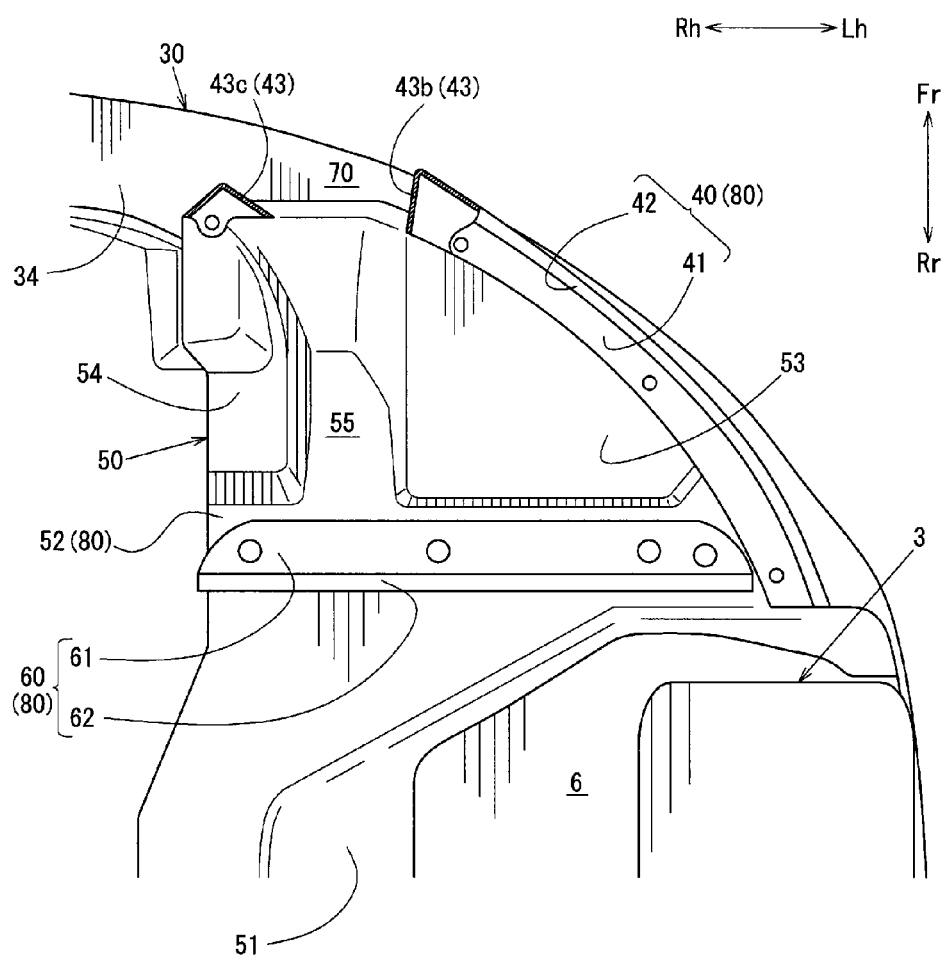
FIG. 6 is an enlarged bottom view showing the major part of the vehicle front portion.
Figure 7:
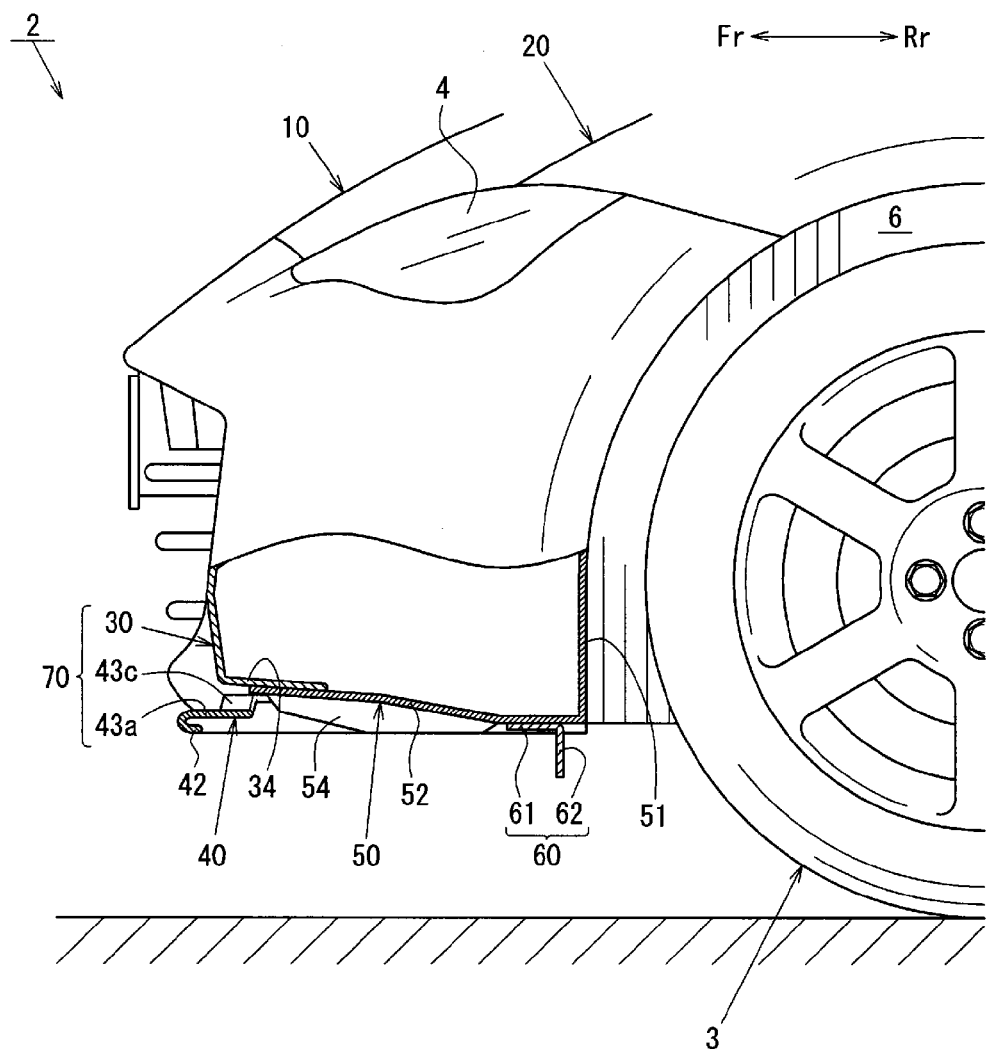
FIG. 7 is a partial sectional view taken along line A-A of FIG. 1 of the major part of the vehicle front portion.
Figure 8:
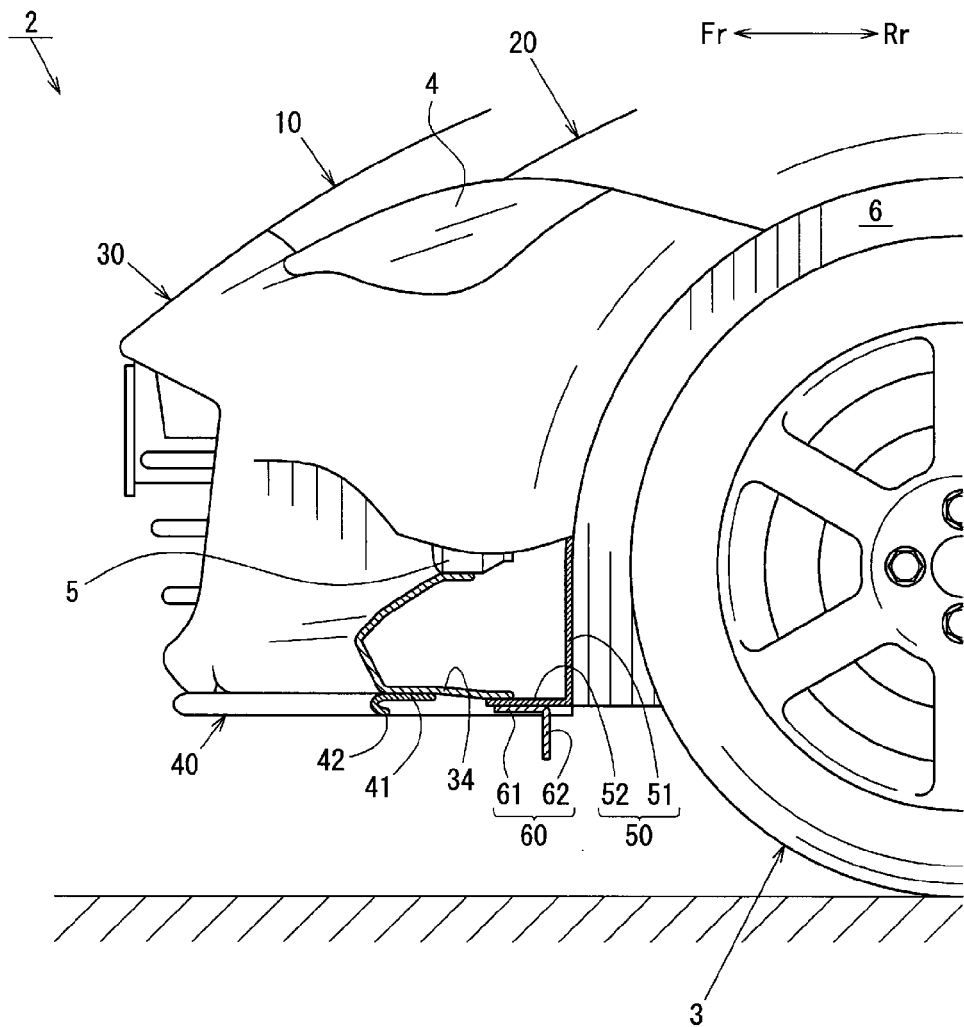
FIG. 8 is a partial sectional view taken along line B-B of FIG. 1 of the major part of the vehicle front portion.

Further, FIG. 6 is an enlarged bottom view showing the major part of the vehicle front portion 2, FIG. 7 is a partial sectional view taken along line A-A of FIG. 1 of the major part of the vehicle front portion 2, and FIG. 8 is a partial sectional view taken along line B-B of FIG. 1 of the major part of the vehicle front portion 2.

Illustrations of an under cover at the center, in a vehicle width direction, of the vehicle front portion 2 are omitted in the figures. Further, the vicinity of a front end of an air dam 40 is shown in FIG. 6 as a partial sectional view. Additionally, illustrations of the inside of the vehicle front portion 2 are omitted in FIGS. 7 and 8 just for clarification of the major part.

Further, in the figures, arrows Fr and Rr show a vehicle longitudinal direction, the arrow Fr showing a vehicle front side and the arrow Rr showing a vehicle rear side. And, arrows Rh and Lh show a vehicle width direction, the arrow Rh showing a vehicle right side and the arrow Lh showing a vehicle left side. Additionally, an upper side of the figure shows a vehicle upper side, and a low side of the figure shows a vehicle lower side.

As shown in FIGS. 1 through 3, the vehicle front portion 2 of the automotive vehicle 1, which is a portion positioned in front of a vehicle compartment in which a driver gets, has the function of absorbing and dispersing a collision load which is transmitted to the vehicle compartment from the vehicle front portion 2, a space for installing components/parts for traveling of the automotive vehicle 1, such as an engine, a transmission, a cooling device, a suspension, a steering device and front wheels 3, some lamps provided at vehicle's front or side portion, such as front lamps 4 and fog lamps 5, and others.

The vehicle front portion 2 of the automotive vehicle 1 constitutes its exterior design face with an engine hood (bonnet) 10, a pair of front fenders 20, a front bumper 30, a pair of air dams 40 (which corresponds to a "downward-extension portion" of the present invention) and others. Further, to a lower face of the vehicle front portion 2 of the automotive vehicle 1 fixedly attached a pair of under covers 50 covering an opening of the lower face and a pair of deflectors 60 (which corresponds to a "partition wall portion" of the present invention).

More specifically, the vehicle front portion 2 of the automotive vehicle 1 has a pair of front wheel houses 6, each of which is an arch-shaped space at a position which is rearward spaced apart from a vehicle's front end in the side view as shown in FIG. 2.

Herein, an inner face of each of the front wheel houses 6 is formed by the under cover 50 and a fender liner 7, which will be described later. Further, the front wheel 3 which is supported by the suspension and coupled to the steering device is arranged inside the front wheel house 6.

The engine hood 10 is a design face covering over an upper face portion of the vehicle front portion 2, and configured to open or close by means of hinges or others as shown in FIGS. 1 and 2. As shown in FIGS. 1 and 2, the front fender 20 is a design face covering a side face portion of the vehicle front portion 2, and configured to be continuous from a design face portion of a side face portion of the vehicle compartment.

The front bumper 30 is a design face covering a side face portion of a portion of the vehicle front portion 2 which is positioned forward of the front wheel 3 and a front face portion of the vehicle front portion 2, and configured to be continuous from the engine hood 10 and the front fender 20 as shown in FIGS. 1 and 2.

The front bumper 30 is configured, as shown in FIG. 1, such that a lower end of its outward portion in the vehicle width direction (a boundary portion 32 and an outward portion 31 which will be described later) is located below a lower end of its central portion in the vehicle width direction (a central portion 33 which will be described later) in the front view. Further, as shown in FIGS. 3 and 7, the front bumper 30 has a bumper bottom portion 34 which is formed by its lower edge configured to be bent inward.

Additionally, a front end of the front bumper 30 is configured to smoothly slant from its central position toward the vehicle's side face in the plan view as shown in FIG. 4. In other words, the font end of the front bumper 30 is configured to smoothly project from the vehicle's side-face side toward the vehicle front side.

More specifically, the front end of the front bumper 30 is configured, as shown in FIGS. 1 and 4, such that the outward portion 31 which corresponds to a range from its vehicle outside portion to the vicinity of the center of the front lamp 4, the boundary portion 32 which corresponds to a range from the vicinity of the center of the front lamp 4 to an inward end portion of the front lamp 4, and the central portion 33 which corresponds to a range between the two front lamps 4 have respective slant angles which are different from each other relative to an imaginary line K which is substantially parallel to the vehicle width direction.

Herein, it is preferable that the slant angle relative to the imaginary line K parallel to the vehicle width direction be set at 30 degrees or greater in order to improve vehicle's cornering in a narrow way, such as in a parking space, reduce the air resistance by letting the traveling air flow toward the vehicle's side face along the slant, and reduce a collision impact against a pedestrian in a pedestrian collision.

The outward portion 31 is configured such that its slant angle θ1 relative to the imaginary line K parallel to the vehicle width direction is 30 degrees or greater. The boundary portion 32 is configured such that its slant angle θ2 relative to the imaginary line K parallel to the vehicle width direction is 30 degrees or greater. The central portion 33 is configured such that it smoothly interconnects the left-and-right boundary portions 32 with an angle which is smaller than the slant angle θ2 of the boundary portion 32.

The above-described pair of air dams 40 are formed separately from each other and extend downward from the boundary portions 32 and the outward portions 31 of the front bumper 30 as shown in FIGS. 1 through 3. The air dams 40 are fixedly attached to the lower edge of the front bumper 30 and the bumper bottom portion 34 by means of adhesive tapes, plastic clips or the like.

More specifically, the air dam 40 comprises an air-dam base portion 41 which contacts the bumper bottom portion 34 and an air-dam bent portion 42 which is formed by an outward end portion of the air-dam base portion 41 configured to be bent inward, which are formed integrally as shown in FIGS. 5 through 8. The air dam 40 is configured as shown in FIG. 4 such that a portion thereof which corresponds to the range of the boundary portion 32 of the front bumper 30 projects forward beyond the front end of the front bumper 30 in the plan view.

This forward-projection portion of the air dam 40 is configured as shown in FIG. 4 such that its slant angle relative to the imaginary line K parallel to the vehicle width direction is substantially equal to the slant angle θ1 of the outward portion 31 of the front bumper 30.

That is, the range where the slant angle θ1 of the front end of the vehicle front portion 2 is 30 degrees or greater is expanded to the range of the outward portion 31 and the boundary portion 32 by the above-described forward-projection portion of the air dam 40.

Additionally, the air dam 40 includes a traveling-air intake portion 70 which opens at a position which corresponds to the range of the boundary portion 32 of the front bumper 30. More specifically, the traveling-air intake portion 70 is formed at a position in the vehicle width direction which corresponds to the inward side of the boundary portion 32 of the front bumper 30, i.e., at a position near the inward end portion, in the vehicle width direction, of the air dam 40.

The traveling-air intake portion 70 is configured such that an upward opening of an air-dam opening portion 43, which is constituted by an opening bottom portion 43a formed by being recessed at the air-dam base portion 41, an opening outward side portion 43b which is positioned at an outward side of the recess-shaped portion, and an opening inward side portion 43c which is positioned at an inward side of the recess-shaped portion, is covered with the bumper bottom portion 34 of the front bumper 30.

The opening outward side portion 43b is positioned below the inward end portion of the outward portion 31 of the front bumper 30 in the front view as shown in FIG. 5. Further, the opening outward side portion 43b is substantially parallel to the vehicle longitudinal direction in the bottom view as shown in FIG. 6.

The opening inward side portion 43c is positioned below the inward end portion of the boundary portion 32 of the front bumper 30 in the front view as shown in FIG. 5. Further, the opening inward side portion 43c is configured to slant from the vehicle inside toward the vehicle outside in the bottom view as shown in FIG. 6. Herein, the height, in a vehicle vertical direction, of the opening inward side portion 43c is configured to be higher than that of the opening outward side portion 43b.

As shown in FIGS. 5 through 7, the traveling-air intake portion 70 which is provided adjacently to the bumper bottom portion 34 and opens toward the vehicle inside from the vehicle outside is formed by fixedly attaching the air dam 40 to the front bumper 30.

The under cover 50 is configured to cover the lower opening over a range from the boundary portion 32 and the outward portion 31 of the front bumper 30 to a vehicle front portion of the front wheel house 6 as shown in FIG. 3.

More specifically, the under cover 50 comprises a cover rear portion 51 which is of substantially an arc shape in the side view and covers the inside of the front wheel house 6 and a cover front portion 52 which covers a range from the front bumper 30 to a front end of the front wheel house 6, which are formed integrally.

The cover rear portion 51 is fixedly attached to the front fender 20 and others by means of plastic clips or the like. The cover front portion 52 is fixedly attached to the bumper bottom portion 34 of the front bumper 30 by means of plastic clips or the like.

Further, the cover front portion 52 comprises, as shown in FIG. 6, an outward projection portion 53 which is formed by a portion positioned outward of the opening outward side portion 43b of the air-dam opening portion 43 and projects downward and an inward projection portion 54 which is formed by another portion positioned inward of the opening inward side portion 43c of the air-dam opening portion 43 and projects downward. An inside face of the outward projection portion 53 is configured to be continuous from the opening outward side portion 43b of the air-dam opening portion 43 in the vehicle width direction.

An outside face of the inward projection portion 54 is configured to be continuous from the opening inward side portion 43c, having its slant angle which is substantially equal to the slant angle of the opening inward side portion 43c of the air-dam opening portion 43, and then extends rearward from a specified position. Herein, a portion of the cover front portion 52 which is positioned between the outward projection portion 53 and the inward projection portion 54 is configured to slant gently downward from the vehicle front side toward the vehicle rear side.

The outward projection portion 53 and the inward projection portion 54 constitute an air-guide portion 55 which is a groove-shaped recess portion which is provided at a vehicle's upper portion to open upward. This air-guide portion 55 is configured to connect the traveling-air intake portion 70 and the deflator 60 which will be described later.

The deflector 60 has its length in the vehicle width direction which is substantially equal to the range of the boundary portion 32 and the outward portion 31 of the front bumper 30 as shown in FIGS. 6 through 8. The deflector 60 is arranged to be rearward spaced apart from the air dam 40, facing the air dam 40, such that its outward end potion is provided substantially continuously to a rear end of the air dam 40. Herein, the deflector 60 is fixedly attached to the cover front portion 52 of the under cover 50 by means of plastic clips or the like.

More specifically, the defector 60 comprises a deflector base portion 61 to be fixed to the cover front portion 52 and a deflector air-reception portion 62 extending downward from a rear end of the deflector base portion 61, and is configured to extend in the vehicle width direction in an L shape in the side view. Further, the deflector air-reception portion 62 of the deflector 60 is configured to extend in the vehicle vertical direction such that its lower end is located below the lower end of the air dam 40.

In the portion positioned forward of the front wheel house 6, the lower-face opening of the vehicle front portion 2 is covered with the cover front portion 52 of the under cover 50, and its vehicle front side and its vehicle outside are enclosed by the air dam 40 and its vehicle rear side is enclosed by the deflator 60, so that a pocket portion 80 (see FIG. 8) which opens inward in the vehicle width direction and has a fan-shaped bottom face is provided.

Figure 9:
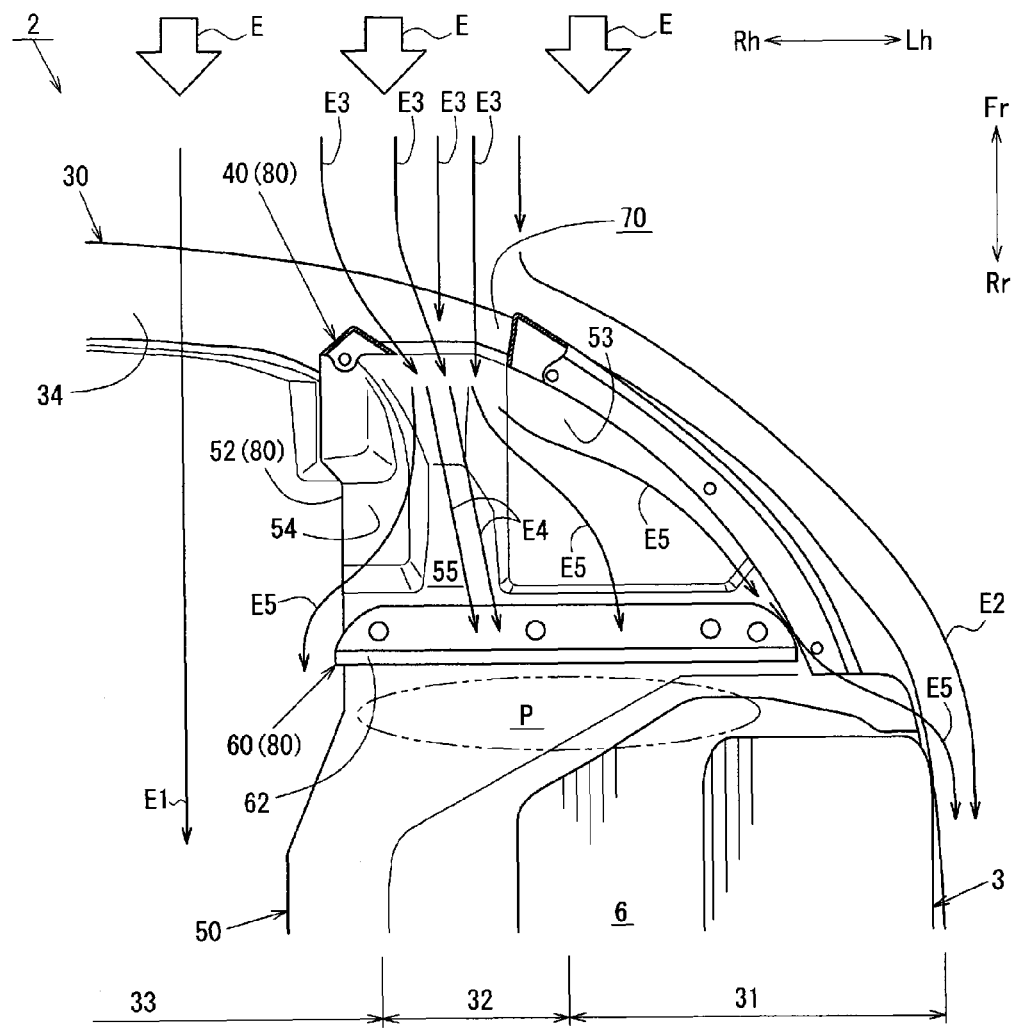
FIG. 9 is an explanatory diagram explaining a flow of traveling air at the vehicle front portion in a bottom view.

In the above-described front air-flow streamlining structure of the automotive vehicle 1, the flow of the traveling air at the vehicle front portion 2 will be described specifically referring to FIGS. 9 through 11. FIG. 9 shows an explanatory diagram explaining the flow of the traveling air at the vehicle front portion 2 in the bottom view, FIG. 10 shows an explanatory diagram explaining the flow of the traveling air at an A-A section, and FIG. 11 shows an explanatory diagram explaining the flow of the traveling air at a B-B section.

Figure 10:
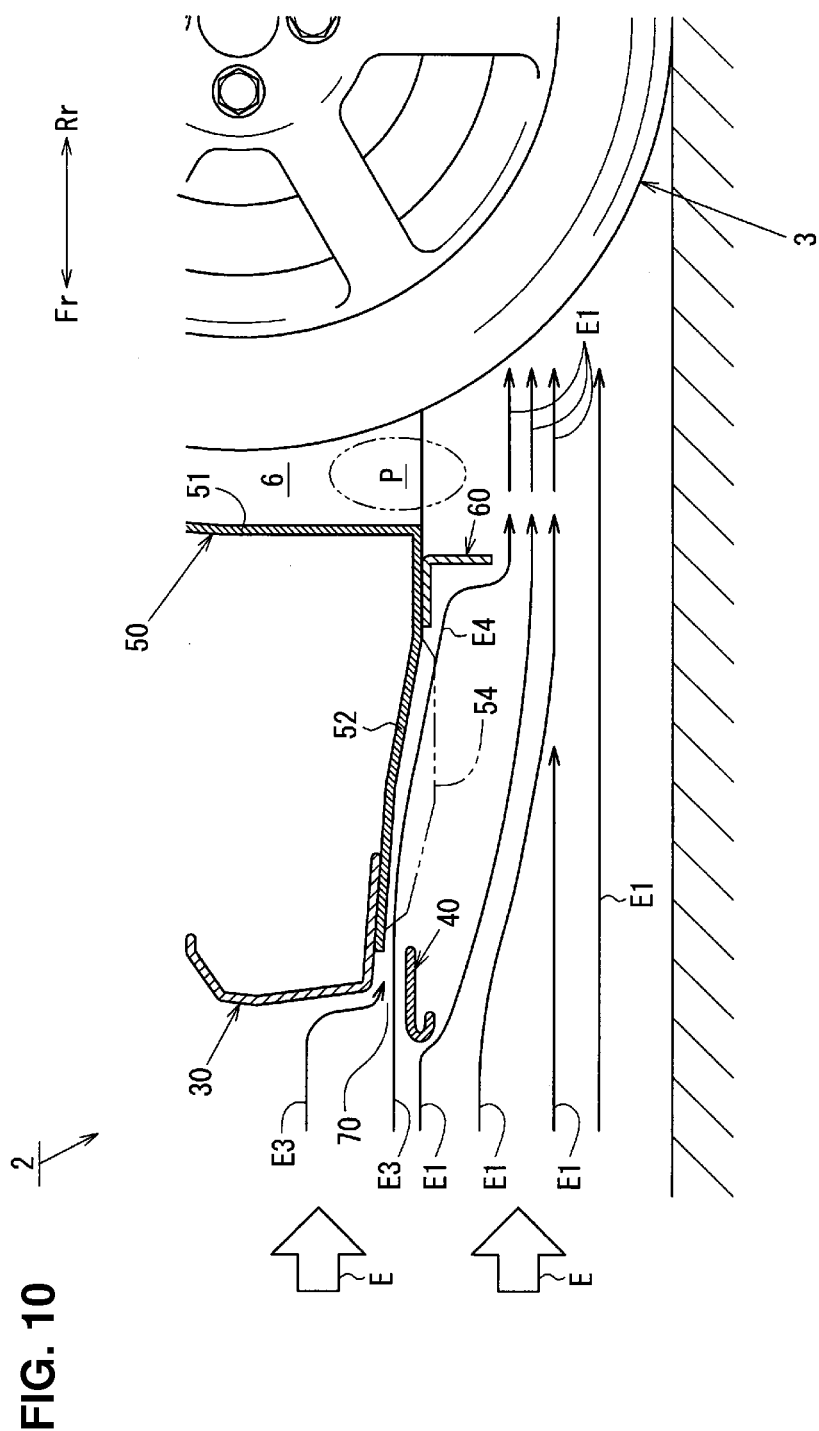
FIG. 10 is an explanatory diagram explaining the flow of the traveling air at an A-A section.
Figure 11:
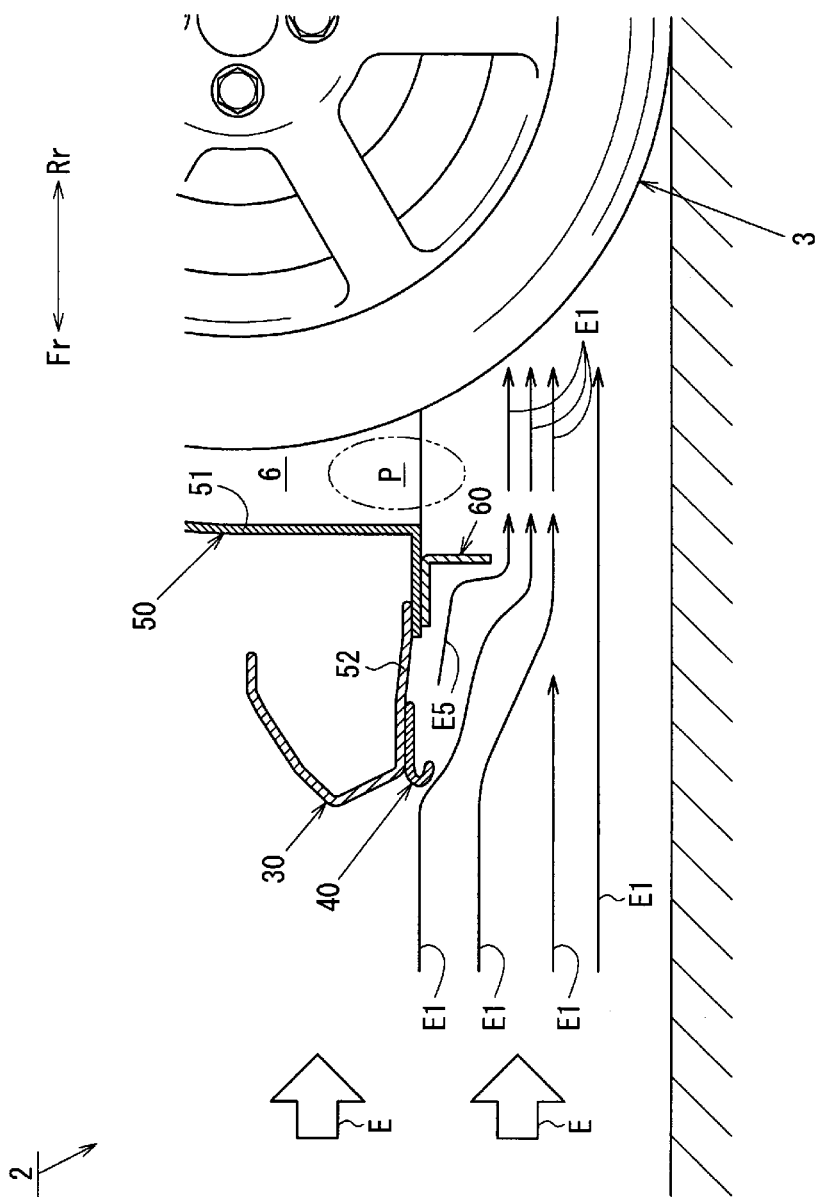
FIG. 11 is an explanatory diagram explaining the flow of the traveling air at a B-B section.

In FIGS. 10 and 11, the front bumper 30, the air dam 40, the under cover 50, and the deflector 60 are shown with their sectional end faces to clarify their major parts. Further, the inward projection portion 54 of the under cover 50 is illustrated by a two-dotted broken line in FIG. 10.

As shown in FIGS. 9 through 11, the traveling air E flowing from the vehicle front side flows toward the vehicle rear side in such a manner that the traveling air E is divided by the vehicle front portion 2 into upper traveling air which is guided toward the vehicle upper side (not illustrated), below-floor traveling air E1 which is guided below a vehicle's floor, side traveling air E2 which is guided toward the vehicle side, and traveling air E3 which is taken in by the traveling-air intake portion 70.

More specifically, the vehicle front portion 2 divides the traveling air E flowing from the vehicle front side into the below-floor traveling air E1 which is guided downward below the vehicle floor along the vicinity of the lower portion of the front bumper 30 and the side traveling air E2 which is guided toward the vehicle side along the front bumper 30 in an range corresponding to the central portion 33 of the front bumper 30 as shown in FIG. 9.

Meanwhile, in the range corresponding to the boundary portion 32 and the outward portion 31 of the front bumper 30, the vehicle front portion 2 divides the traveling air E flowing from the vehicle front side into the below-floor traveling air E1 which is guided downward along the vicinity of the lower portion of the air dam, the side traveling air E2 which is guided toward the vehicle side along the front bumper 30 and the air dam 40, and the intake traveling air E3 which is taken in by the traveling-air intake portion 70 as shown in FIGS. 9 through 11.

In this case, in the range corresponding to the boundary portion 32 of the front bumper 30, the below-floor traveling air E1 flowing downward along the air dam 40 changes its flowing direction downward so as to pass below the lower end of the deflator 60, and then flows toward the vicinity of a lower portion of the front wheel 3 as shown in FIG. 10.

Meanwhile, in the range corresponding to the outward portion 31 of the front bumper 30, the below-floor traveling air E1 divided downward by the air dam 40 flows toward the deflector air-reception portion 62 of the deflector 6 as shown in FIG. 11.

Herein, as shown in FIGS. 9 and 10, the traveling-air intake portion 70 guides the joined traveling air which the traveling air flowing in directly from the vehicle front side, the traveling air guided downward along the vicinity of the lower portion of the front bumper 30, and the traveling air guided toward the vehicle side merge in so as to take in this joined traveling air into the pocket portion 80 as the intake traveling air E3. In this case, the traveling-air intake portion 70 guides the intake traveling air E3 into the pocket portion 80 such that the intake traveling air E3 flows from the outward side toward the inward side in the vehicle width direction.

Accordingly, the traveling air E3 taken in by the traveling-air intake portion 70 is divided, inside the pocket portion 80 as shown in FIG. 9, into traveling air E4 which flows toward the deflator 60 along the air-guide portion 55 and traveling air E5 which spreads in the vehicle width direction toward the outward projection portion 53 and the inward projection portion 54 of the under cover 50, and then flows rearward.

Herein, part of the traveling air E5 spreading in the vehicle width direction flows toward the vehicle side face along the inner face of the air dam 40, not toward the deflector 60, and then joins the side traveling air E2, or flows toward the inward side in the vehicle width direction and then joins the below-floor traveling air E1 flowing in the range corresponding to the central portion 33.

Inside the pocket portion 80, the traveling air E4 flowing in the air-guide portion 55 flows toward the deflector 60 along the lower face of the cover front portion 52, without separating from a surface of the lower face of the cover front portion 52 due to its viscosity as shown in FIG. 10. Then, the traveling air E4 flowing out of the air-guide portion 55 flows downward along the deflector 60.

Meanwhile, the traveling air E5 spreading in the vehicle width direction and flowing rearward flows toward the deflector 60 along the lower face of the cover front portion 52, without separating from the surface of the lower face of the cover front portion 52 due to its viscosity as shown in FIG. 11. Then, the traveling air E5 flows downward along the deflector 60.

As shown in FIGS. 10 and 11, the traveling air E4 and the traveling air E5 which flow downward along the deflector 60 joins the below-floor traveling air E1 flowing near the lower end of the deflector 60, changing the flowing direction of the below-floor traveling air E1 downward, and then flows toward the vicinity of the lower portion of the front wheel 3.

As described above, by streamlining the traveling air E flowing from the vehicle front side, it becomes difficult that the below-floor traveling air E1 flows in the front wheel house 6 rearward of the deflector 60. Accordingly, the speed of the air flowing in the front wheel house 6 rearward of the deflector 60 becomes slower than the speed of the air flowing below the floor of the vehicle front portion 2, so that a negative-pressure area P having a relatively negative pressure therein is generated behind the deflector 60.

This negative-pressure area P attracts the air flowing generated by a rotation of the front wheel 3, thereby restraining the flowing toward the vehicle side face. That is, the vehicle front portion 2 restrains turbulence of the side-face flowing on the vehicle side face by streamlining the traveling air E flowing from the vehicle front side.

As described above, the front air-flow streamlining structure of the automotive vehicle 1 to streamline the traveling air E can reduce the air resistance during vehicle traveling and easily adjust the lift generated at the vehicle front portion 2. Specifically, since the direction of the traveling air E flowing from the vehicle front side can be changed downward by the air dam 40, the front air-flow streamlining structure of the automotive vehicle 1 can restrain the traveling air E flowing from flowing into the front wheel house 6.

Thereby, the front air-flow streamlining structure of the automotive vehicle 1 can restrain the air resistance caused by the turbulence of the side-face air flowing down along the vehicle's side face. Further, since the front end of the vehicle front portion 2 is formed in the curve shape in the bottom view, the air dam 40 can guide the traveling air E flowing from the vehicle front side toward the vehicle's side face. Thereby, the front air-flow streamlining structure of the automotive vehicle 1 can reduce the air resistance more.

And, since the traveling-air intake portion 70 introduces the traveling air E into the pocket portion 80, the front air-flow streamlining structure of the automotive vehicle 1 can adjust the lift generated at the vehicle front portion 2 easily. More specifically, the traveling-air intake portion 70 introduces the traveling air E into the pocket portion 80, so that the front air-flow streamlining structure of the automotive vehicle 1 can decrease the difference in speed between the below-floor traveling air E1 flowing outside the pocket portion 80 and the traveling air E4, E5 flowing inside the pocket portion 80.

Accordingly, the front air-flow streamlining structure of the automotive vehicle 1 can decrease the pressure inside the pocket portion 80, or substantially eliminate the deference in pressure between the outside of the pocket portion 80 and the inside of the pocket portion 80. In this case, the front air-flow streamlining structure of the automotive vehicle 1 can restrict the flow amount of the intake traveling air E3 taken in by the traveling-air intake portion 70 by setting the size of the opening of the traveling-air intake portion 70 properly.

For example, by setting the opening of the traveling-air intake portion 70 to be properly small, the front air-flow streamlining structure of the automotive vehicle 1 can decrease the flow amount of the intake traveling air E3 taken in by the traveling-air intake portion 70, thereby generating the negative pressure inside the pocket portion 80. Meanwhile, by setting the opening of the traveling-air intake portion 70 to be properly large, the front air-flow streamlining structure of the automotive vehicle 1 can increase the flow amount of the intake traveling air E3 taken in by the traveling-air intake portion 70, thereby restraining the negative pressure from being generated inside the pocket portion 80.

Thereby, the front air-flow streamlining structure of the automotive vehicle 1 can easily adjust the lift generated at the vehicle front portion 2. Accordingly, the front air-flow streamlining structure of the automotive vehicle 1 can easily adjust the balance of the lift generated at the vehicle front portion with the lift generated at the vehicle's rear portion according to the kind of the vehicle, without providing any wing to generate the down force at the vehicle's rear portion, for example. Thus, the front air-flow streamlining structure of the automotive vehicle 1 can reduce the air resistance during vehicle traveling and also easily adjust the lift generated at the vehicle front portion 2.

Further, the traveling-air intake portion 70 is configured to open at the inward portion, in the vehicle width direction, of the air dam 40. Thereby, the front air-flow streamlining structure of the automotive vehicle 1 can supply the traveling air E into the pocket portion 80 efficiently.

Specifically, since the front end of the vehicle front portion 2 is formed in the curve shape in the bottom view, for example, the flow of the traveling air at the vehicle front portion 2 is configured such that the inward-side flow is rather straight and the outward-side flow curves toward the vehicle side.

Therefore, in a case in which the traveling-air intake portion 70 is formed in the range of the outward portion 31, the traveling-air intake portion 70 cannot take in the side traveling air E2 flowing toward the vehicle side stably, so that there is a concern that the intake traveling air E3 having a large flow amount enough to adjust the lift at the vehicle front portion 20 may not be introduced or the turbulence of the side traveling air E2 flowing toward the vehicle side may become improperly large.

Then, by forming the traveling-air intake portion 70 at the inward portion, in the vehicle width direction, of the air dam 40, the traveling-air intake portion 70 can take in the traveling air E flowing from the vehicle front side surely. Thereby, even if the opening of the traveling-air intake portion 70 is small, for example, the front air-flow streamlining structure of the automotive vehicle 1 can efficiently guide the traveling air E3 having the large flow amount enough to adjust the lift at the vehicle front portion 2 into the pocket portion 80.

Accordingly, the front air-flow streamlining structure of the automotive vehicle 1 can surely guide the traveling air E toward the inside of the pocket portion 80 by forming the traveling-air intake portion 70 at the inward portion, in the vehicle width direction, of the air dam 40, so that the lift generated at the vehicle front portion 2 can be stabilized.

Further, by configuring the traveling-air intake portion 70 to slant from the vehicle inward side toward the vehicle outward side, the front air-flow streamlining structure of the automotive vehicle 1 can guide the traveling air E toward the inside of the pocket portion 80 more surely. Specifically, in a case in which the position of the traveling-air intake portion 70 is close to the opening of the pocket portion 80 in the vehicle width direction, there is a concern that the intake traveling air E3 may flow out of the opening of the pocket portion 80.

Herein, by configuring such that the traveling-air intake portion 70 slants from the vehicle inward side toward the vehicle outward side, the traveling-air intake portion 70 can take in the intake traveling air E3 such that the intake traveling air E3 taken in flows from the vehicle inward side toward the vehicle outward side in the pocket portion 80.

Thereby, the front air-flow streamlining structure of the automotive vehicle 1 can restrain the intake traveling air E3 taken in by the traveling-air intake portion 70 from flowing out of the opening of the pocket portion 80. Accordingly, the front air-flow streamlining structure of the automotive vehicle 1 can surely guide the traveling air E into the pocket portion 80 through the traveling-air intake portion 70, thereby stabilizing the lift generated at the vehicle front portion 2 more.

Further, since the vehicle front portion 70 is formed at the position of the air dam 40 which corresponds to the boundary portion 32 of the front bumper 30, the traveling-air intake portion 70 can take in the traveling air E flowing rearward from the vehicle front and the side traveling air E2 flowing toward the vehicle's side face.

Thereby, the front air-flow streamlining structure of the automotive vehicle 1 can introduce the traveling air E flowing from the vehicle front side into the pocket portion 80 more efficiently through the traveling-air intake portion 70 even in a case in which the size of the opening of the traveling-air intake portion 70 is not set to be sufficiently large.

Thus, by configuring such that the traveling-air intake portion 70 slants from the vehicle inward side toward the vehicle outward side, the front air-flow streamlining structure of the automotive vehicle 1 can efficiently introduce the traveling air E into the pocket portion 80, thereby stabilizing the lift generated at the vehicle front portion 2.

Additionally, by providing the air-guide portion 55 at the cover front portion 52 of the pocket portion 80, the front air-flow streamlining structure of the automotive vehicle 1 can stabilize the pressure in the pocket portion 80. Specifically, in a case in which the traveling-air intake portion 70 is configured to slant from the inward side toward the outward side, the intake traveling air E3 taken in by the traveling-air intake portion 70 flows, spreading in the pocket portion 80, and then flows out of the opening of the pocket portion 80, or flows out from a rear end of the air dam 40 toward the vehicle side, so that there is a concern that the lift generated at the vehicle front portion 2 may become unstable.

Then, by providing the air-guide portion 55, the front air-flow streamlining structure of the automotive vehicle 1 can guide the intake traveling air E3 taken in by the traveling-air intake portion 70 with the air-guide portion 55 properly inside the pocket portion 80. Thereby, the front air-flow streamlining structure of the automotive vehicle 1 can restrain the intake traveling air E3 taken in from spreading.

In this case, since a larger amount of intake traveling air E3 can be made to spread in the pocket portion 80, the front air-flow streamlining structure of the automotive vehicle 1 can stabilize the pressure in the pocket portion 80. Thus, the front air-flow streamlining structure of the automotive vehicle 1 can stabilize the lift generated at the vehicle front portion 2 more by means of the air-guide portion 55.

Moreover, since the range having the slant angle θ1 of 30 degrees or greater at the front end of the vehicle front portion 2 is enlarged by the air dam 40, the front air-flow streamlining structure of the automotive vehicle 1 can easily adjust the lift generated at the vehicle front portion 2 and also achieve reduction of the air resistance, improvement of the design, and improvement of the pedestrian's protection performance.

Further, the traveling air E3 taken in by the traveling-air intake portion 70 flows down toward the deflector 60, keeping its flowing speed, and then the traveling air E4, E5 which has reached the deflector 60 flows downward, changing its flow direction. And, when this flowing air E4, E5 joins to the traveling air E1 which flows near the lower end of the deflector 60, this flowing air E4, E5 with the direction changed by the deflector 60 operates so as to change the flowing direction of the above-described traveling air E1 flowing near the lower end of the deflector 60 downward. Accordingly, it can be properly prevented that the traveling air E1 flowing below the floor of the front portion of the vehicle flows into the front wheel house 6. Thus, the present embodiment can improve the streamlining effect of the traveling air E by the deflector 60 with the traveling-air intake portion 70.

Also, since the traveling-air intake portion 70 is comprised of the air-dam opening portion 43 of the air dam 40 and the front bumper 30, the replacement of the air dam 40 can be easy and also the traveling-air intake portion 70 can be formed at a loser position to the cover front portion 52. Specifically, since the air dam 40 is located at the level lower than the cover front portion 52, there is a concern that the air dam 40 may get broken when interfering with the road surface. Herein, if the traveling-air intake portion 70 deforms or gets broken, the streamlining effect by the deflector 60 may not be attained sufficiently. Thus, the present embodiment in which the air dam 40 is formed separately from the front bumper 30 is superior in easier replacing to a case in which the air dam 40 is formed integrally with the front bumper 30. Accordingly, even if the air dame 40 gets broken, a situation in which the streamlining effect is not obtained properly because of the traveling-air intake portion's deforming or getting broken can be prevented. Further, since the traveling-air intake portion 70 is comprised of the air-dam opening portion 43 of the air dam 40 and the front bumper 30, the traveling-air intake portion 70 can be formed at the loser position to the cover front portion 52. Thereby, the traveling air can be made to flow toward the deflector 60 along the cover front portion 52 more surely. Accordingly, the maintenance of the vehicle front portion 2 can be improved, improving the streamlining effect of the traveling air E4, E5 by the deflector 60, by forming the air dam 40 separately from the front bumper 30.

Herein, while the front end of the front bumper 30 is configured to slant smoothly from the central portion, in the vehicle width direction, thereof toward the vehicle side face in the above-described embodiment, the shape of the front end of the front bumper is not limited this shape but may be configured to be substantially parallel to the vehicle width direction. In this case, the traveling-air intake portion 70 may be formed at any proper position, in the vehicle width direction, of the air dam 40.

Further, while the air dam 40 is formed separately from the front bumper 30, it may be formed integrally with the front bumper 30 or the under cover 50. Moreover, the air dam 40 is provided in the range from the boundary portion 32 to the outward portion 31 of the front bumper 30, it may be provided over an entire area, in the vehicle width direction, of the front bumper 80.

Also, while the traveling-air intake portion 70 is comprised of the front bumper 30 and the air dam 40, it may be configured as the one which opens at the air dam 40. And, while the traveling-air intake portion 70 has the wall faces, such as the opening bottom portion 43a, it may be configured as the one which has an opening with a specified largeness, without having the opening bottom portion 43a.

Additionally, while the air-guide portion 55 is comprised of the groove-shaped recess portion opening upward, it may be comprised of a fin-shaped air-flow streamlining plate projecting downward and also it may be formed separately from the under cover 50.

The "under cover" of the present invention corresponds to the cover front portion 52 of the above-described embodiment. Likewise, the "partition wall portion" corresponds to the deflector 60, the "downward-extension portion" corresponds to the air dam 40, and "intake traveling air" taken in by the traveling-air intake portion corresponds to the intake traveling air E3.

The present invention should not be limited to the above-described embodiment, and any other modifications or improvements may be applied within the scope of a spirit of the present invention.

Figure 12:
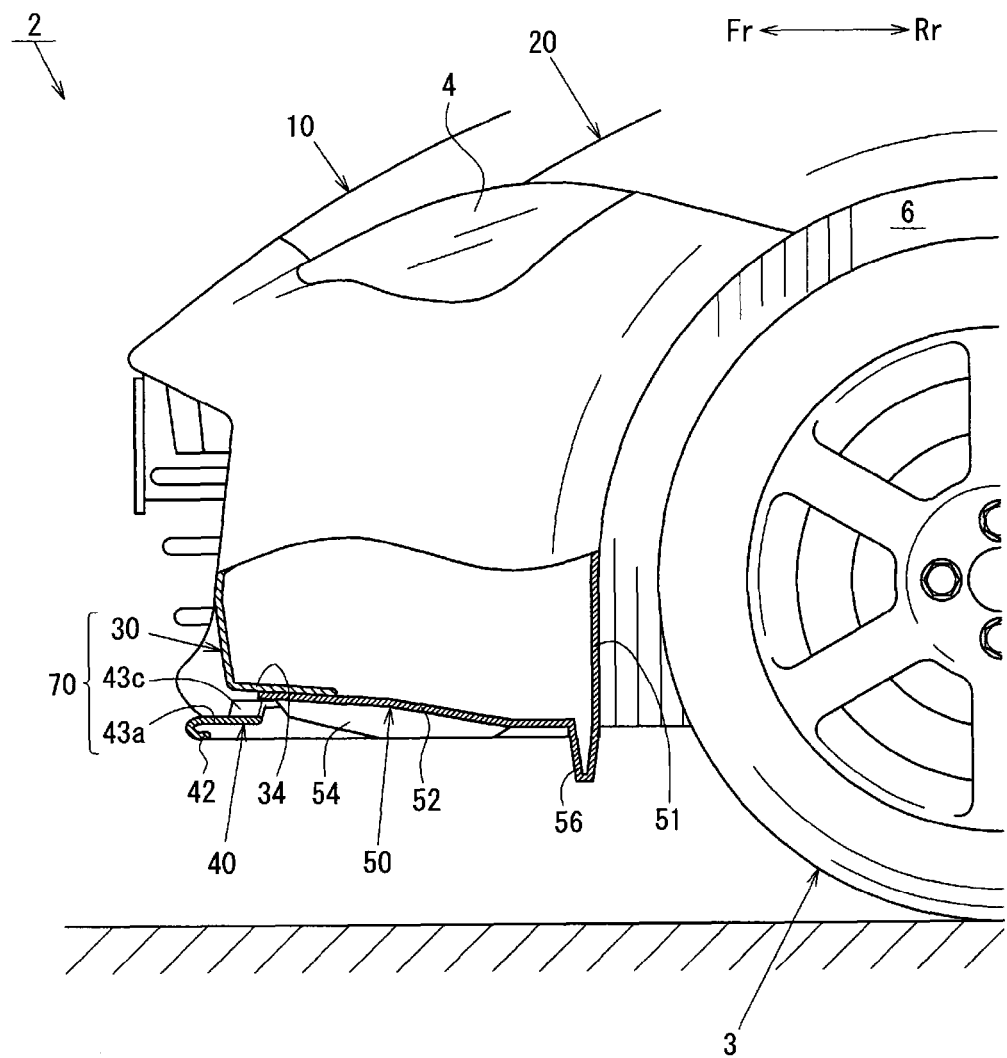
FIG. 12 is a partial sectional view taken along line A-A of a modified major part of the vehicle front portion.

For example, as illustrated in FIG. 12 showing a partial sectional view taken along line A-A of a modified major part of the vehicle front portion 2, a partition wall portion 56 may be configured such that the rear portion of the cover front portion 52 of the under cover 50 projects downward in the range corresponding to the boundary portion 32 and the outward portion 31 of the front bumper 30. Thereby, the front air-flow streamlining structure of the automotive vehicle 1 can adjust the lift generated at the vehicle front portion 2 easily, without increasing the number of parts/components.

Specifically, the partition wall portion 56 constituting the pocket portion 80 also functions as a deflector to restrain the below-floor traveling air E1 from flowing into the front wheel house 6, so that the front air-flow streamlining structure of the automotive vehicle 1 does not require that the partition wall portion 56 and the deflector are formed separately from each other. Thereby, the front air-flow streamlining structure of the automotive vehicle 1 can properly restrain the vehicle weight and the costs from increasing.

Thus, by configuring such that the partition wall portion 56 is comprised of the deflector, the front air-flow streamlining structure of the automotive vehicle 1 can achieve both the reduction of the air resistance during vehicle traveling and the adjustment of the lift generated at the vehicle front portion 2, without increasing the number of parts/components. Herein, while the partition wall portion 56 is formed integrally with the under cover 50, it may be formed separately from the under cover 50. Further, it may be configured such that the vehicle front portion 2 comprises the deflector 60 and the partition wall portion 56.

What is claimed is:

1. A front air-flow streamlining structure of an automotive vehicle, comprising:
    an under cover covering a lower-face opening of a vehicle front portion of the automotive vehicle which is positioned forward of a front wheel house;
    a downward-extension portion projecting downward and extending along a lower edge of a front bumper; and
    a partition wall portion provided between the downward-extension portion and the front wheel house in a vehicle longitudinal direction to be spaced rearward apart from the downward-extension portion,
    wherein said partition wall portion is configured to project downward and extend in a vehicle width direction to overlap with the front wheel house in the vehicle width direction, a pocket portion enclosed by the under cover, the downward-extension portion, and the partition wall portion is provided between the downward-extension portion and the partition wall portion such that a vehicle-downward side thereof opens, and a traveling-air intake portion which opens so as to take in traveling air toward an inside of said pocket portion is provided at the downward-extension portion or at a position located above the downward-extension portion.

2. The front air-flow streamlining structure of the automotive vehicle of claim 1, wherein said downward-extension portion extending along the lower edge of the front bumper is configured such that an outward end portion, in the vehicle width direction, thereof is provided substantially continuously to said partition wall portion, whereby said pocket portion is configured such that an inward side, in the vehicle width direction, thereof opens.

3. The front air-flow streamlining structure of the automotive vehicle of claim 1, wherein said traveling-air intake portion is configured to open at an inward portion, in the vehicle width direction, of the downward-extension portion.

4. The front air-flow streamlining structure of the automotive vehicle of claim 1, wherein said traveling-air intake portion is configured to slant from a vehicle inward side toward a vehicle outward side.

5. The front air-flow streamlining structure of the automotive vehicle of claim 1, wherein said partition wall portion is comprised of a deflector which is fixedly attached to a rear end of said under cover.

6. The front air-flow streamlining structure of the automotive vehicle of claim 1, wherein an air-guide portion to guide the traveling air taken in by said traveling-air intake portion is provided at said under cover of said pocket portion.

7. The front air-flow streamlining structure of the automotive vehicle of claim 1, wherein said under cover is attached to a lower end of the front bumper, a deflector, of which said partition wall portion is comprised, is provided at a rear end portion of the under cover, and said traveling-air intake portion is configured to take in the traveling air toward said deflector.

8. The front air-flow streamlining structure of the automotive vehicle of claim 1, wherein said traveling-air intake portion is configured to slant from a vehicle inward side toward a vehicle outward side or slant from the vehicle outward side toward the vehicle inward side.

9. The front air-flow streamlining structure of the automotive vehicle of claim 1, wherein said downward-extension portion is formed separately from the front bumper and has an opening portion at least at an upper portion thereof which opens toward said partition wall portion, and said traveling-air intake portion is comprised of said opening portion of the downward-extension portion and the front bumper.

10. The front air-flow streamlining structure of the automotive vehicle of claim 1, wherein said partition wall portion includes a portion projecting downwardly, the downwardly projecting portion extending in a vehicle width direction.

11. The front air-flow streamlining structure of the automotive vehicle of claim 10, wherein the downwardly projecting portion of said partition wall portion extends below the downward-extension portion in a vehicle vertical direction.

12. A front air-flow streamlining structure of an automotive vehicle, comprising:
    an under cover covering a lower-face opening of a vehicle front portion of the automotive vehicle which is positioned forward of a front wheel house;
    an air dam projecting downward and extending along a lower edge of a front bumper;

a partition wall portion provided between the air dam and the front wheel house in a vehicle longitudinal direction to be spaced rearward apart from the air dam, wherein said partition wall portion is configured to project downward and extend in a vehicle width direction to overlap with the front wheel house in the vehicle width direction, an outward end portion, in the vehicle width direction, of said air dam is provided substantially continuously to the partition wall portion, a pocket portion enclosed by the under cover, the air dam, and the partition wall portion is provided between the air dam and the partition wall portion such that an inward side, in the vehicle width direction, thereof opens, and a traveling-air intake portion which opens so as to take in traveling air toward an inside of said pocket portion is provided at the air dam.

13. The front air-flow streamlining structure of the automotive vehicle of claim 12, wherein said partition wall portion includes a portion projecting downwardly, the downwardly projecting portion extending in a vehicle width direction.

14. The front air-flow streamlining structure of the automotive vehicle of claim 13, wherein the downwardly projecting portion of said partition wall portion extends below the air dam in a vehicle vertical direction.

* * * * *